(No Model.)
J. McPARLAND.
HAME.
No. 305,526. Patented Sept. 23, 1884.
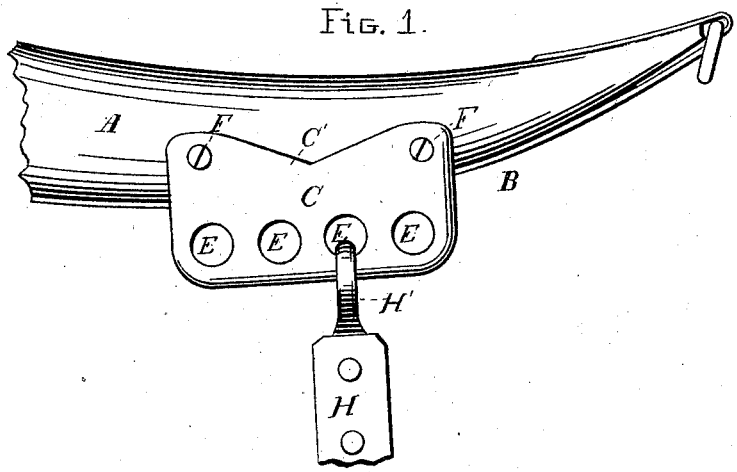
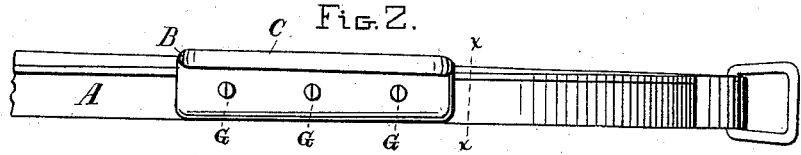
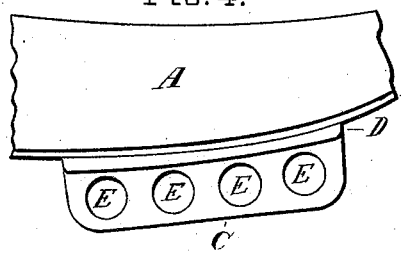
Witnesses.
P. B. Turpin,
H. Parker
Inventor.
John McParland
By R. S. & A. P. Lacey
Attys.

UNITED STATES PATENT OFFICE.

JOHN McPARLAND, OF MASONVILLE, IOWA.

HAME.

SPECIFICATION forming part of Letters Patent No. 305,526, dated September 23, 1884.

Application filed July 29, 1884. (No model.)

*To all whom it may concern:*

Be it known that I, JOHN MCPARLAND, a citizen of the United States, residing at Masonville, in the county of Delaware and State of Iowa, have invented certain new and useful Improvements in Hames; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.
This invention relates to hames, and has for its object a simple, inexpensive attachment which may be readily applied to the ordinary hames, and which when applied will permit the adjustment of the point of draft to suit the animal.

To this end it consists in the novel construction and combination hereinafter described, and pointed out in the claims.

In the drawings, Figure 1 is a front, Fig. 2 an edge, and Fig. 4 a back view of a section of a hame provided with my improvement. Fig. 3 is a transverse section on line $x$ $x$, Fig. 2.

The hame A may be of the ordinary construction, as shown. The attachment B consists of the main plate C and the rib or flange D. The main plate is perforated near its outer edge with a series of openings, E, disposed longitudinally along the plate. The inner edge of the plate C is preferably cut out centrally at C', and it is secured to the front edge of the hame A by screws F F. From the rear side of the main plate, slightly nearer the inner than the outer edge, I project the rib or flange D, which, it will be seen, is conformed to the outer side or edge of the hame. This is most clearly shown in Fig. 4. Through this rib or flange I form openings to receive the screws G G, whereby this rib may be secured to the hame. This rib or flange serves as a broad bearing against the hame, and relieves the screws F F of considerable strain. It will be understood that good results will be had if the screws G G be dispensed with; but for greater security I prefer to use them, as shown.

In use the attachment can be readily applied and secured to the hame, and the hook H' of trace H can be connected in any one of holes E, high or low, to suit the animal. It will be noticed that the point of connection can be changed from one to another one of the holes until the proper one is determined.

My attachment may be manufactured in quantities and applied to the hames by the teamsters or other users, its application not requiring the skill of a mechanic.

Having thus described my invention, what I claim, and desire to secure by Letters Patent, is—

1. As an improved article of manufacture, the herein-described attachment for hames, consisting of the main plate having near its outer edge a longitudinally-disposed series of openings, and provided with a right-angled wing or flange conformed to the hame, substantially as set forth.

2. The combination, with the hame, of the attachment consisting of the main plate having near its outer edge a series of openings, and provided with an approximately right-angled wing or flange conformed to the hame, and the fastening-screws, substantially as set forth.

In testimony whereof I affix my signature in presence of two witnesses.

JOHN McPARLAND.

Witnesses:
F. S. GRIFFIN,
GEORGE HARWOOD.